United States Patent
Ha et al.

(10) Patent No.: US 9,237,524 B2
(45) Date of Patent: Jan. 12, 2016

(54) SLEEP MODE OPERATION FOR NETWORKED END DEVICES

(75) Inventors: Wai-leung Ha, Queensway (HK); Kairy Kai Lei, Shen Zhen (CN); Kwok Wa Kenny Kam, Tai Po (HK)

(73) Assignee: Computime, Ltd., Hong Kong (HK)

( * ) Notice: Subject to any disclaimer, the term of this patent is extended or adjusted under 35 U.S.C. 154(b) by 322 days.

(21) Appl. No.: 13/570,606

(22) Filed: Aug. 9, 2012

(65) Prior Publication Data

US 2014/0047254 A1 Feb. 13, 2014

(51) Int. Cl.
*G06F 1/32* (2006.01)
*H02J 9/00* (2006.01)
*H04W 52/02* (2009.01)

(52) U.S. Cl.
CPC ......... *H04W 52/0235* (2013.01); *G06F 1/3203* (2013.01); *G06F 1/32* (2013.01); *H02J 9/005* (2013.01); *H04W 52/02* (2013.01); *H04W 52/0261* (2013.01)

(58) Field of Classification Search
CPC . H04W 56/15; H04W 52/02; H04W 52/0261; H04W 52/0235; G06F 1/32; G06F 1/3202; H02J 9/005
USPC ........................... 713/323, 322, 400; 455/458
See application file for complete search history.

(56) References Cited

U.S. PATENT DOCUMENTS

| | | | |
|---|---|---|---|
| 7,505,795 B1 * | 3/2009 | Lim et al. ...................... | 455/574 |
| 2001/0031626 A1 * | 10/2001 | Lindskog et al. ........... | 455/67.3 |
| 2005/0049012 A1 * | 3/2005 | Chang et al. .................. | 455/574 |
| 2008/0004044 A1 * | 1/2008 | Simpson et al. .............. | 455/458 |
| 2010/0029267 A1 * | 2/2010 | Yang et al. .................... | 455/425 |
| 2010/0052421 A1 * | 3/2010 | Schindler et al. ............... | 307/35 |
| 2010/0159959 A1 * | 6/2010 | Santhanam et al. ........... | 455/458 |
| 2010/0232329 A1 * | 9/2010 | Park et al. ...................... | 370/311 |
| 2010/0279683 A1 * | 11/2010 | Lee ............................... | 455/434 |
| 2011/0022716 A1 * | 1/2011 | Diab ............................... | 709/231 |
| 2011/0164539 A1 * | 7/2011 | Krishnaswamy et al. ..... | 370/311 |
| 2012/0323391 A1 | 12/2012 | Drake et al. | |

FOREIGN PATENT DOCUMENTS

| | | | |
|---|---|---|---|
| JP | 2009055301 A | | 3/2009 |
| WO | 2008016834 A1 | | 2/2008 |
| WO | 2014004153 A1 | | 1/2014 |

* cited by examiner

*Primary Examiner* — Jaweed A Abbaszadeh
*Assistant Examiner* — Terrell Johnson
(74) *Attorney, Agent, or Firm* — Banner & Witcoff, Ltd.

(57) ABSTRACT

A technique provides apparatuses, methods, and computer readable media for sending sleep information from an end device to a central unit of a network, in which the wake-up time of the end device is aligned to the scanning time for the central unit. The technique addresses at least two considerations: the clock accuracy of the end device is accounted for, and the reason that the end device requests sleep mode operation is provided. To address the above considerations, the end device may send its clock tolerance information and/or request for sleep mode (RSM) command to the central unit once the end device is connected via the network. The central unit may then adjust the scanning time based on the clock tolerance information. If the central unit receives a response from the end device during the adjusted scanning time, the central unit deems that the end device is still connected.

23 Claims, 9 Drawing Sheets

TABLE 1: RSM TO DEVICE CONDITION MAPPING

| RSM CODE 601 | DEVICE OPERATING CONDITION 602 |
|---|---|
| 000 | Normal |
| 001 | Battery marginally low |
| 010 | Battery moderately low |
| 011 | Battery acutely low |
| 100 | Night operation |
| 101 | Charging problem |
| 110 | Not assigned |
| 111 | Not assigned |

FIGURE 6

TABLE 2: SLEEP TIME VALUE/ACTION

| RSM CODE 601 | SLEEP TIME VALUE 701 | ACTION INDICATION 702 |
|---|---|---|
| 000 | ½ hour | None |
| 001 | 1 hour | None |
| 010 | 2 hour | Optional battery replacement |
| 011 | 4 hour | Recommend battery replacement or extend sleep time |
| 100 | 4 hour | None |
| 101 | 2 hour | Reposition end device or replace charging circuit |

FIGURE 7

TABLE 3: DEVICE ID TO DEVICE LOCATION

| DEVICE ID <u>801</u> | LOCATION <u>802</u> |
|---|---|
| 000000 | BUILDING 5, ROOM 1201 |
| 000001 | BUILDING 1, ROOM 501 |
| 000010 | NOT ASSIGNED |
| ... | |
| 111111 | BUILDING 2, ROOM 100 |

SLEEP MODE OPERATION FOR NETWORKED END DEVICES

FIELD

Aspects described herein relate to supporting sleep operation for networked devices.

BACKGROUND

The number of networked devices (e.g., sensors, switches, and thermostats) is increasing at an explosive rate. For example, with the "Internet of things," which may be referred as the "Internet of embedded devices," factory control systems, medical devices, cars, the smart grid, and communication systems are being deployed. Approximately 5 billion embedded devices are now networked (year 2012) to the Internet. Projections suggest that the number will increase to 15 billion by year 2015. In addition, additional networked devices are incorporated into other private home and industrial networks. Because of the sheer number of networked devices, as well as the often remote deployment of the devices, techniques are incorporated to extend the operation of the devices to reduce maintenance of the devices. One approach is for the devices to operate in a sleep mode to reduce electrical power consumption of the networked devices. During the sleep mode, a battery-powered device operates at low power, often saving significant electrical consumption and consequently extending the battery life.

With traditional systems, embedded devices may sleep and wake up for a predetermined period of time in order to save energy consumption. The networked devices may be constantly scanned to verify the availability of the networked devices. However, this traditional approach may be characterized by one or more deficiencies.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

With an aspect of the disclosure, a technique is supported for sending sleep time from an end device to a central unit of a network, in which the wake-up time of the end device is aligned to the scanning time for the central unit. The technique addresses at least two considerations. The clock accuracy of the end device is accounted for, and furthermore the reason that the end device requests sleep mode operation is known. To address the above considerations, the end device may send its clock tolerance information to the central unit once the end device is connected via the network. The central unit may then adjust the scanning time based on the clock tolerance information. If the central unit receives a response from the end device during the scanning time, the central unit deems that the end device is still connected.

An end device may provide sleep information about its sleep mode operation in a number of ways. For example, the end device may send a time request to the central unit with a time value for operating in the sleep state. Alternatively, the end device may send a request for sleep mode (RSM) command to the central unit. The RSM command comprises a code that is defined between the end device and the central unit. The central unit may then determine the operating condition at the end device, action that should be performed for the end device, and the requested sleep time.

With another aspect, a central unit determines a targeted energy usage for a network, which may comprise a plurality of end devices. The central unit then budgets energy consumption for each of the end devices and sends a sleep mode request with an associated sleep time to each of the end devices.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
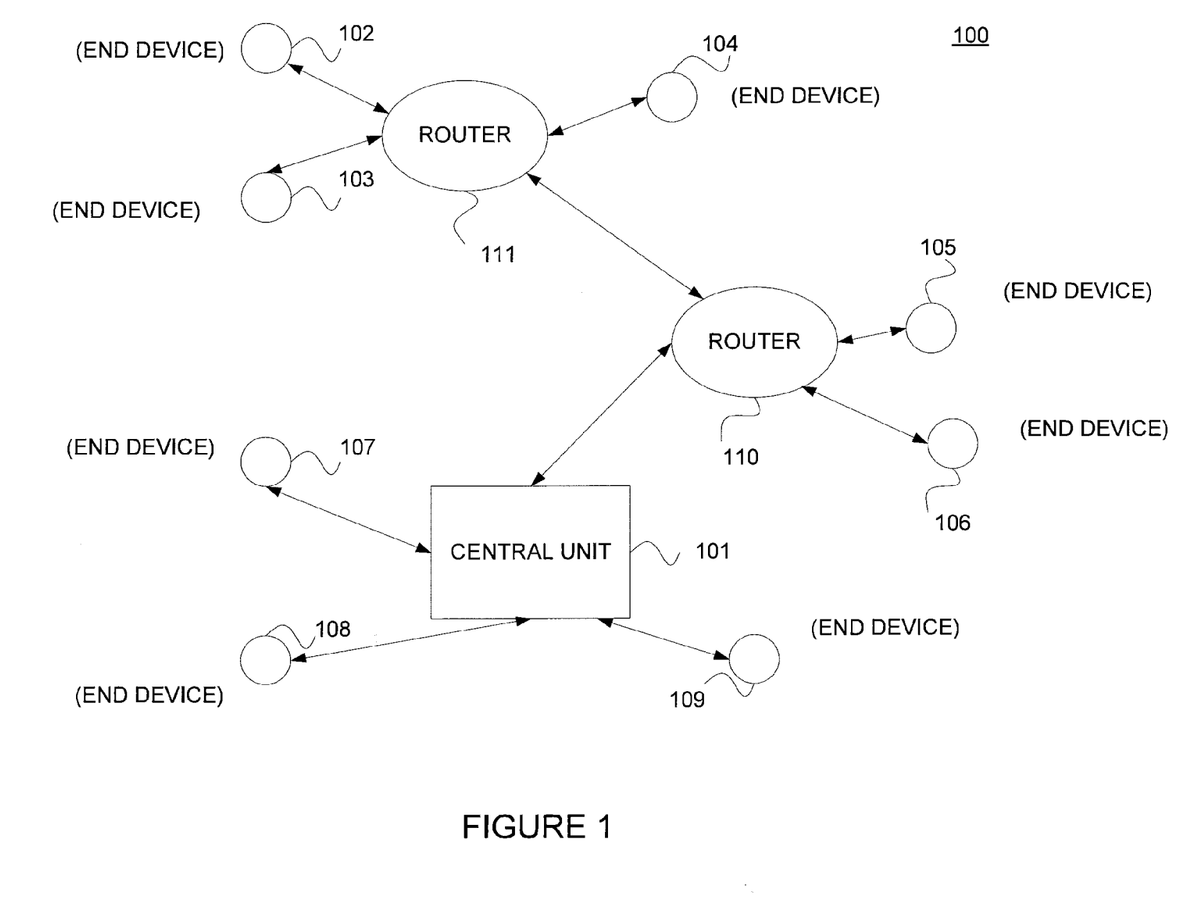
FIG. 1 shows a network with a central unit and end devices in accordance with an embodiment.

FIG. 1 shows network 100 with central unit 101 (which may be referred to as a coordinator or a gateway), routers 110-111, and end devices 102-109 (e.g., a sensor, switch, or thermostat) in accordance with an embodiment. Network 100 may support one of different network specifications, including ZigBee®, Bluetooth®, and Z-Wave®. For example, Zigbee devices may be used in smart energy, medical, and home automation applications. With smart energy applications, Zigbee products are often used to monitor and control use of energy and water, which helps consumers save energy and water and save money too. With medical applications, Zigbee may support connecting a large number of health monitoring devices. With home automation applications, Zigbee supports the control of domestic lighting, such as switches, dimmers, occupancy sensors, and load controllers.

With some embodiments, central device 101 starts a personal area network (PAN) so that end devices 102-109 can join network 100 through routers 110-111. Central device 101 may be responsible for selecting the channel and PAN ID. Central device 101 may assist in routing the data through the mesh network and allows join requests from routers 110-111 and end devices 110-111. As will be discussed, central device 101 supports sleep mode operation of end devices 102-109 to reduce the overall energy consumption of network 100. Central device 101 typically maintains its electrical power and does not operate in a sleep mode.

With some embodiments, central unit 101 starts the joining process by assigning a PAN ID to network 100 Assignment may be done in different ways, e.g., manual (pre-configured) and dynamic (obtained by checking other PAN IDs of networks already in the operation nearby so that PAN ID does not conflict with other networks). After central unit 101 completes its configuration, central unit 101 can accept network joining request queries from routers 110-111 and end devices 102-109 that wish to join the PAN.

With some embodiments routers 110-111 may be joined into network 100. For example, router 110 joins before end devices 105-106 and before router 111 can join. Routers 110-111 typically maintain electrical power and do not support sleep mode operation.

End devices 102-109 typically do not allow other devices to join network 100, assist in routing data through the network 100, or support child devices. End device 102-109 may be battery powered and may consequently operate in a sleep mode operation so that the device 102-109 can forego tasks and reduce electrical power consumption, thus extending the operating time of the device's battery.

There are different ways for end device 102-109 to join network 100. End device 102-109 may join network 100 via a media access control (MAC) sub-layer or the network layer. Once central unit 101 has established a personal area network, end device 102-109 determines whether central unit 101 is allowing device to join network 100. For example, end device 102-109 may send an association request frame and may join network 100 as soon as end device 102-109 receives an association response. Central device 101 may allow end devices 102-109 to join based on different factors, including the number of end devices that have already joined.

End devices 102-109 are often battery-operated so that the devices can be operated independently from an AC power source. The battery life of RF end devices 102-109 (networked devices) may be an important concern when operating network 100. With some embodiments, battery-operated RF end devices 102-109 will sleep and wake up for a predetermined period of time in order to reduce the energy consumption. Central unit 101 (also referred as a gateway or coordinator), may need to determine whether end device 102-109 is still in the network 100. With some traditional systems, central device 101 can constantly scan network 100 to check for the availability of end devices 102-109. This technique is often called a "heartbeat" of RF wireless networking.

However, if end device's operation and wake up frequency depends on the environment or its status, e.g., at night or when battery has low charge, the fixed heartbeat technique may not benefit the battery life. Furthermore, if end devices 102-109 wake up all at the same time, the excessive RF traffic may affect the transmission quality provided by network 100 and result in transmission retries. This situation consequently may affect the battery life of battery-power too.

Figure 2:
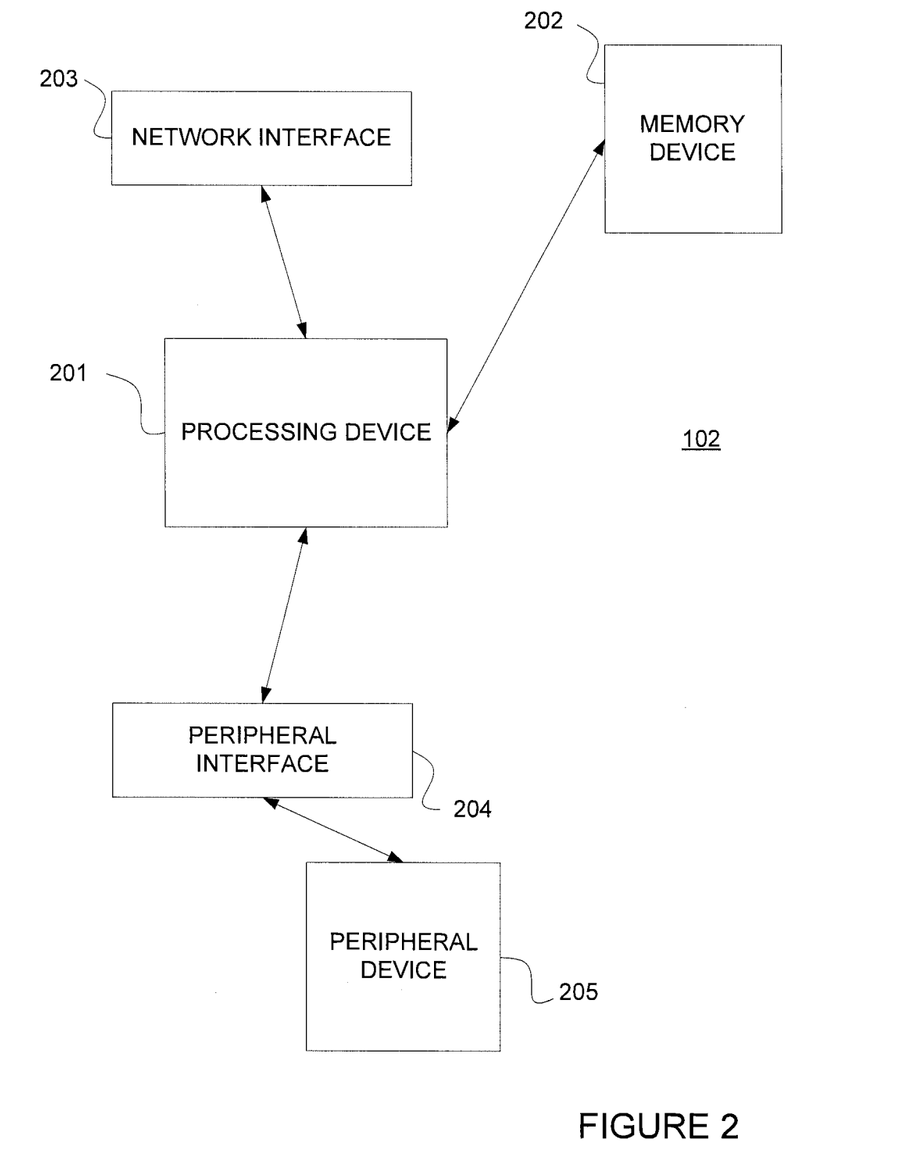
FIG. 2 shows an end device in accordance with an embodiment.

FIG. 2 shows end device 102 in accordance with an embodiment. End device 102 includes processing device 201, memory device 202, and network interface 203 that interfaces to network 100. At least one processing device 201 executes computer-executable instructions from memory device 202 so that end device can provide the intended functionality, wherein the processes discussed herein may be implemented, and can communicate with central unit 101 via network 100. Processing device 201, which includes at least one processor, typically controls overall operation of end device 102. Memory device 202 comprises computer-readable storage media that may be any available media that may be accessed by processing device 201.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 201. By way of example, and not limitation, computer readable media may comprise a combination of computer storage media and communication media.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

End device 102 may interface to a peripheral device 205 (e.g., a sensor device and may be integrated with or external to end device 102) through peripheral device 204. With some embodiments, peripheral device 205 may be controlled by processing device 201 and/or provide input information and/or support output functionality.

Figure 3:
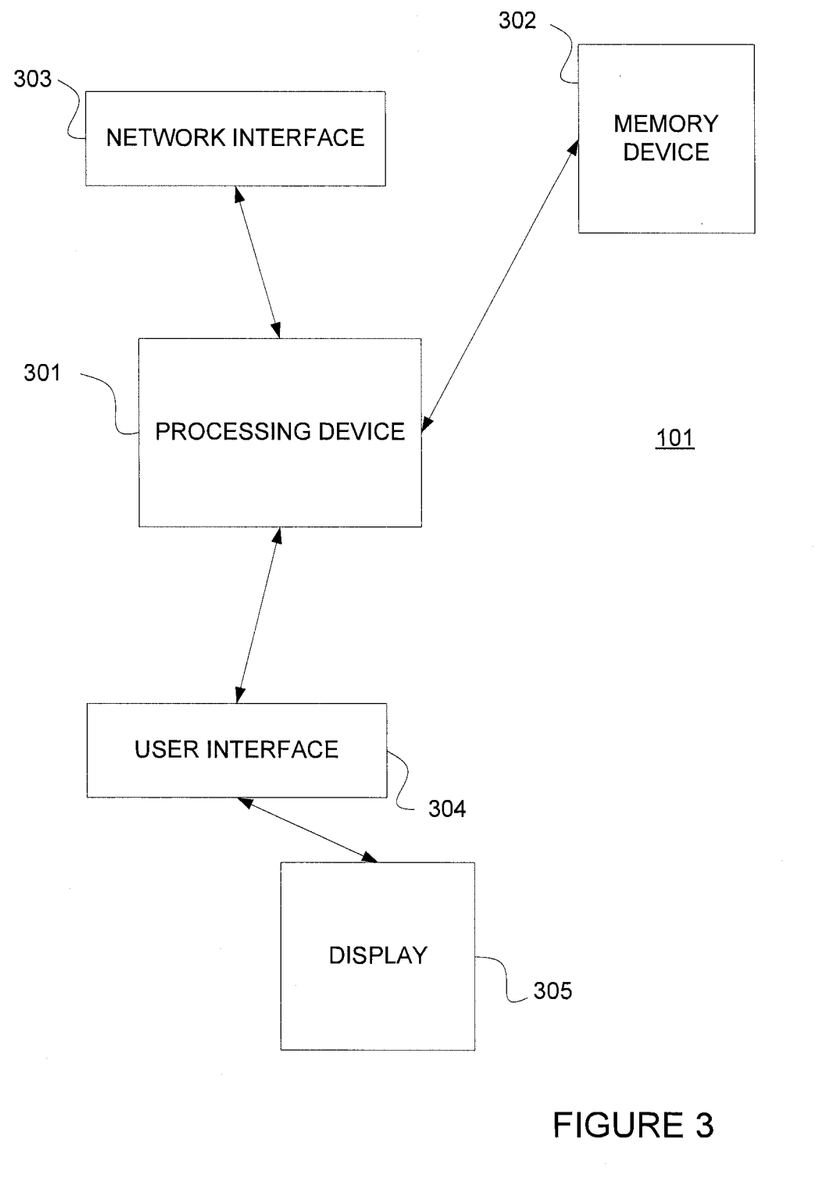
FIG. 3 shows a central unit in accordance with an embodiment.

FIG. 3 shows central unit 101 in accordance with an embodiment. Central unit 101 includes processing device 301, memory device 302, and network interface 303. At least one processing device 301 executes computer-executable instructions from memory device 302 so that end device can provide the intended functionality, wherein the processes discussed herein may be implemented, and can communicate with end devices 102-109 via network 100. Processing device 301, which includes at least one processor, typically controls overall operation of central device 101. With some embodiments, the operation of memory device 302 is similar to those of memory device 202 (as shown in FIG. 2) as previously discussed.

Central device 101 may interface to display device 305 through user interface 304 to notify a user about a course of action that may be performed for a given end device. The display device may be integrated with central device or external to central device 101. For example, if the end device's battery has a low charge, the user may be informed on display device 305 that the battery should be replaced.

Figure 4:
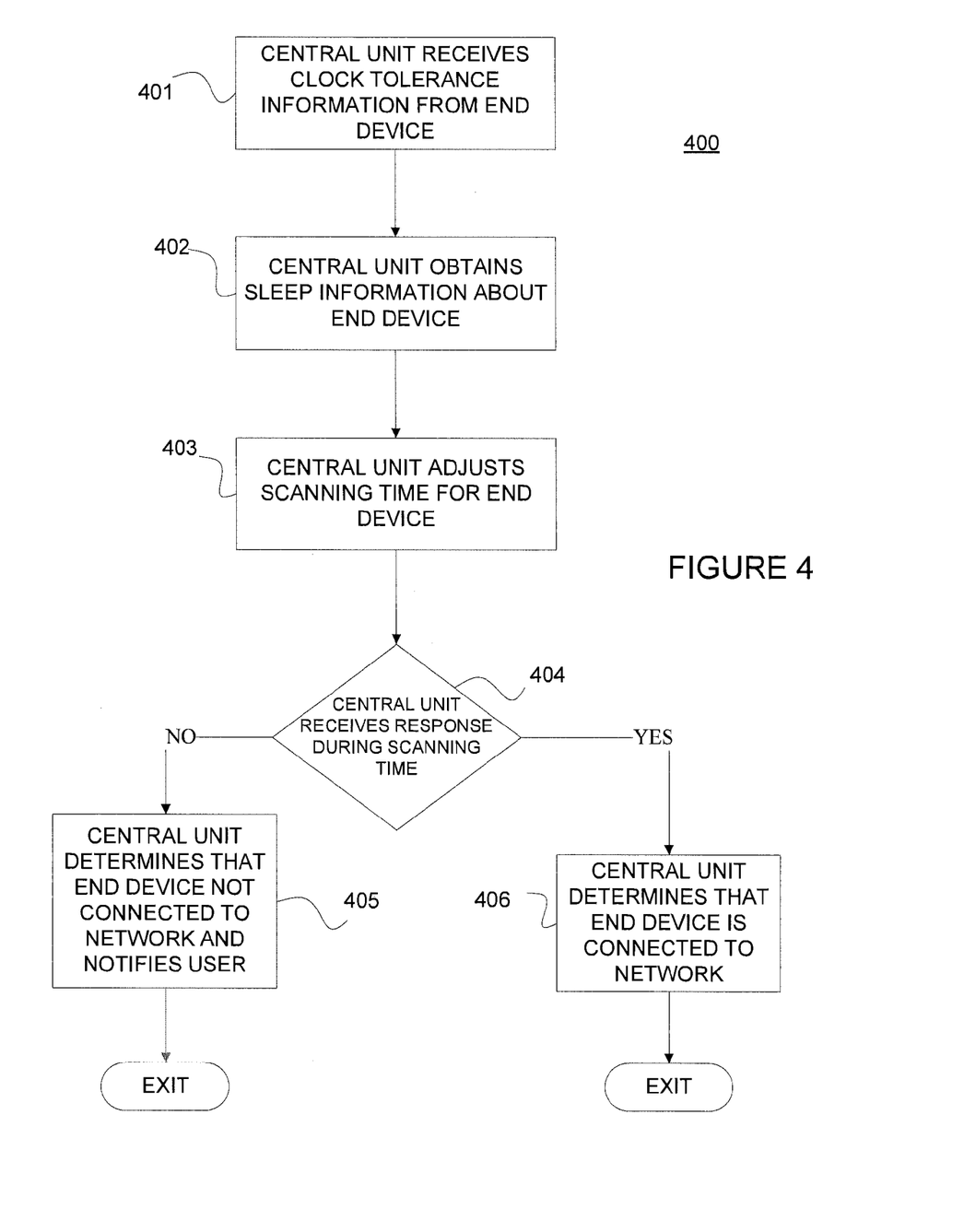
FIG. 4 shows a flow diagram for supporting a sleep mode for an end device by a central unit in accordance with an embodiment.

FIG. 4 shows flow diagram 400 for supporting a sleep mode of end device 102 by a central unit 101 in accordance with an embodiment. With one aspect, a technique is supported for sending sleeping time from end device 102 to central unit 101 (which may be referred to as a gateway or coordinator) in which the wake-up time of end device 102 is aligned to the scanning time for central unit 101. The technique addresses at least two considerations. First, the clock accuracy of end device 102 is accounted for. For example, if the sleep time is large and end device 102 has poor clock tolerance on end devices, central unit 101 may miss the wake up of end device 102 when end device 102 sends a response. Second, central unit 101 may not know the reason that end device 102 requests sleep mode operation so that corrective action is not performed in an expeditious manner.

To address the above considerations, end device 102 (e.g., a sensor, switch, or thermostat) may send its clock tolerance information to central unit 101 (e.g., hub, server, or gateway) for network 100 once end device 102 is connected to central unit 101 via network 100. As will be further discussed, central unit 101 may adjust the scanning time based on the clock tolerance information.

Figure 6:
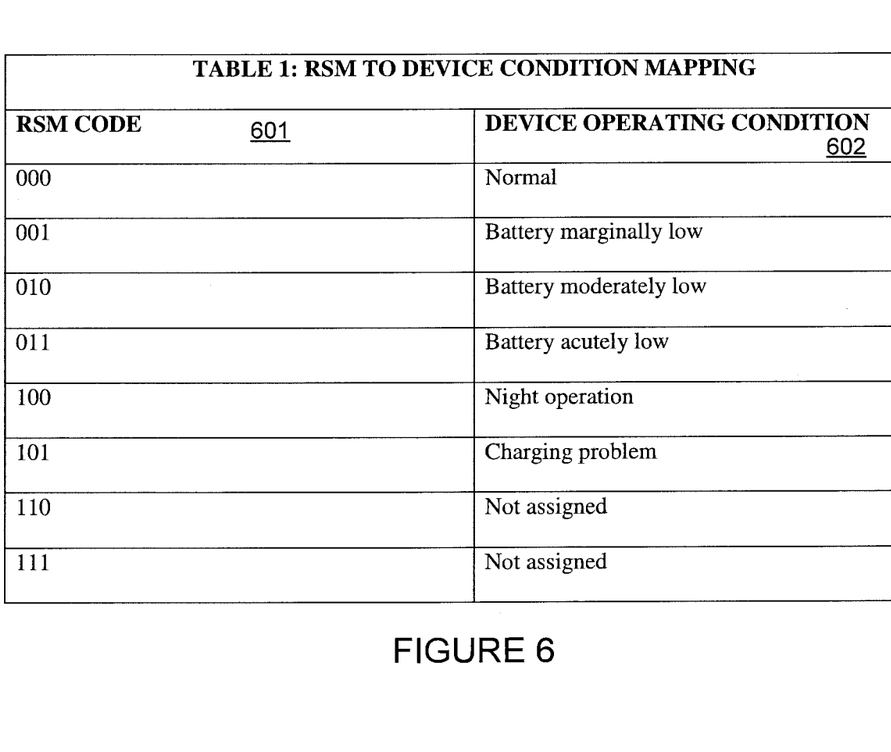
FIG. 6 shows an example of associating status information received from an end device to an operating condition of the end device in accordance with an embodiment.

End device 102 may provide sleep information about its sleep mode operation a number of ways. For example, end device 102 may send a time request to central unit 101 with a time value for operating in the sleep state. Alternatively, end device 102 may send a request for sleep mode (RSM) command to central unit 101. The RSM command comprises a code that is defined between the end device 102 and central unit 101. For example, one RSM code may signify that the end device's battery is low. Another RSM code may denote that end device 102 is requesting sleep mode operation because the end device is operating in night operation. When the RSM code is received, central unit 101 may determine the sleep time of end device 102 at initial setup. For example, central unit 101 may map the amount of sleep time with the RSM code as shown in Table 2 (FIG. 7), With some embodiments, central unit 101 may use a table (e.g., Table 1 as shown in FIG. 6) to determine the operating condition at end device 102 that is associated with the sleep request.

Figure 7:
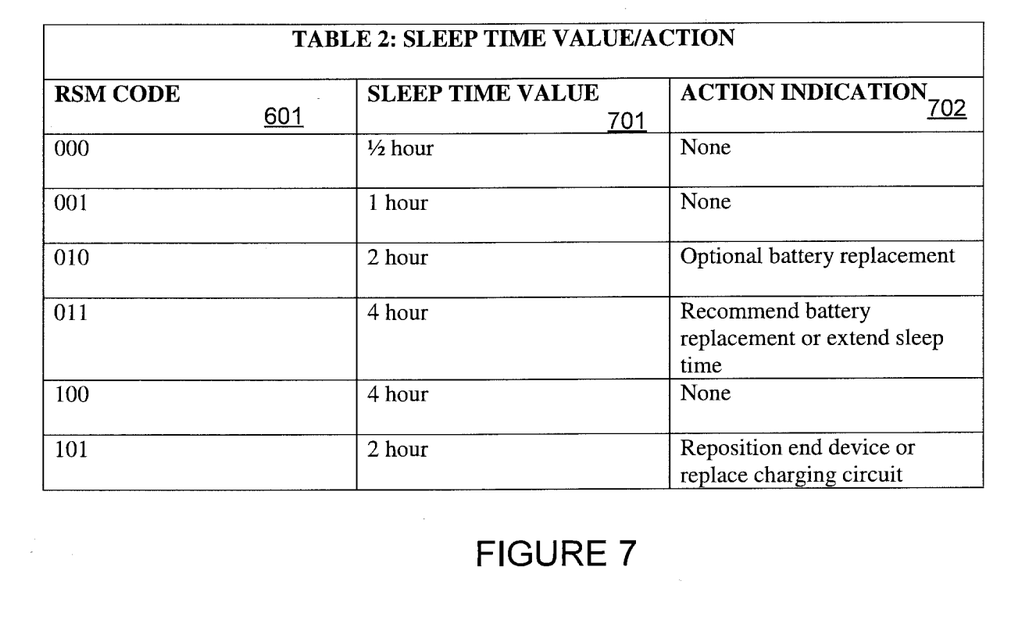
FIG. 7 show an example of associating status information received from an end device to a sleep time value for the end device and action that can be initiated for the end device in accordance with an embodiment.

Central unit 101 may generate Table 1 in a number of ways, e.g., knowing the table information a priori, obtaining the table information from end device 102, or obtaining the table information through a user interface. From the RSM code, besides extending the sleep time of end device 102, central unit 101 may determine what happened at end device 102 and consequently can notify an end user to perform appropriate actions (e.g., Table 2 as shown in FIG. 7).

At block 401, end device 102 sends clock tolerance information about its internal clock to central unit 101. End device 102 may use the internal clock to determine when to wake up from sleep mode operation. When end device 102 wakes up, end device 102 may send to central unit 101 (corresponding central unit 101 receiving the response at block 404) a response that may comprise a measurement message, an all-is-well message, a sleep mode request, or some other specified message.

At block 402, central unit 101 obtains sleep information about end device 102. For example, end device 102 may inform central unit 101 about the time when end device is in the sleep mode. The sleep time may be expressed as a relative value (e.g., from a particular time), an absolute value, or a periodic time (e.g., the end device going into a sleep state every particular amount of time). As another example, as will be further discussed, central unit 101 may receive a RSM code from end device 102 that is indicative of the operating condition at end device 102. Central unit 101 may then map the code to timing information about sleep mode operation at end device 102. As will be discussed, central unit 101 may also send a sleep mode request for end device 102 to go into a sleep state for a particular amount of time. Alternatively, central unit 101 may know a priori when end device 102 is operating in a sleep mode or may be informed through a user interface.

At block 403, central unit 101 adjusts the sleep information to obtain a scanning time when central unit 101 should receive a response from end device 102. For example, if the clock tolerance of end device 102 were +/−5%, the wake up time may be adjusted by central unit 101 to wake up earlier in time by a factor of 0.95 of the expected time. Also, the scanning window may be increased by a factor of 1.1 of the expected scan time.

At block 404, central unit 101 scans for a response from end device 102 during the adjusted scanning time. If central device 101 does not receive a response within the determined time interval, at block 405 central unit 101 determines that end device 102 is not connected to network 100. This may be the case for different reasons. For example, end device 102 has been physically removed or end device 102 does not have adequate electrical power that requires that the battery to be replaced. With some embodiments, central unit 101 may generate an indicator so that a user can be informed about the situation. However, if central unit 101 does receive a response during the scanning time at block 406, central unit 101 deems that end device 102 is still connected to network 102.

Figure 5:
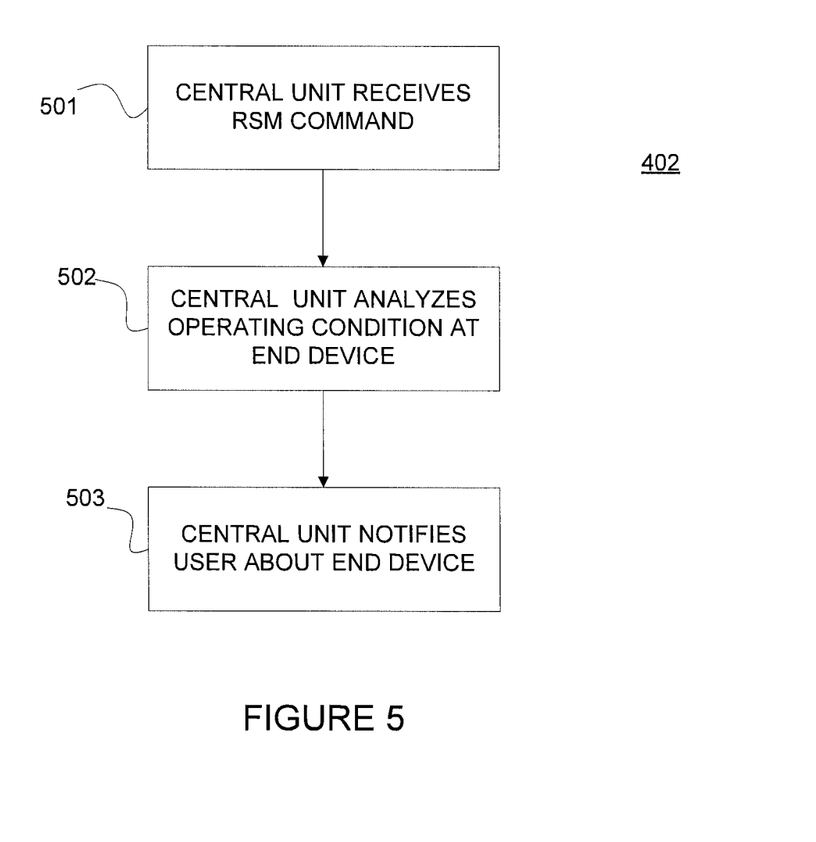
FIG. 5 shows a flow diagram executed by a central unit to process a request for sleep mode (RSM) command from an end device in accordance with an embodiment.

FIG. 5 shows flow diagram 500 that is executed by central unit 101 processing a request for sleep mode (RSM) command from end device 102 in accordance with an embodiment. As discussed above, central unit 101 may receive an RSM command from end device 102 at block 501. The RSM code 601 may be mapped to an operating condition 602 at end device 102 at block 502, for example, using Table 1. For example, when RSM code 601 equals "011", the end device's battery is deemed as being "acutely low." Also, the user may be notified on display 305 (as shown in FIG. 3) at block 503 that the battery should be replaced based on the action information 702 in Table 2. Also, sleep time 701 is extended to four hours in order to reduce energy consumption when the battery is low. As another example, when the RSM code equals "101", the operating condition at end device 102 is related to a charging problem (based on Table 1, i.e., the battery is not charging properly because, for example, there is not enough energy being harvested). In such a case, the user may be informed to replace the charging circuit and/or reposition end device 102 so that more energy can be harvested.

Figure 8:
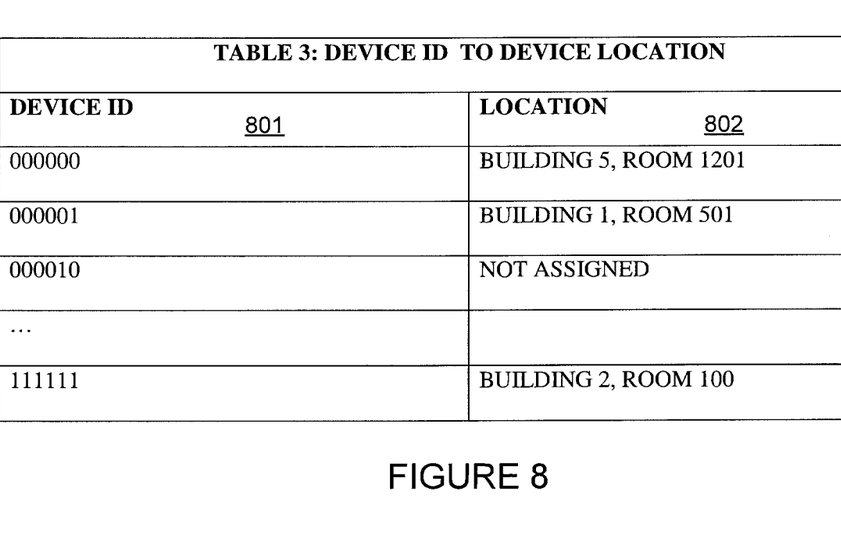
FIG. 8 shows a mapping of the device identification of an end device with the location of the end device in accordance with an embodiment.

FIG. 8 shows Table 3 having a mapping of device identification 801 of end device 102 with location 802 of end device 102 in accordance with an embodiment. While not explicitly shown in FIG. 1, network 100 may comprise a large number of end devices. The end devices may be widely distributed, may be dynamically relocated, and concealed to a user. In order facilitate track the location of the end devices, central unit 101 may generate Table 3 so that central unit 101 can determine the location of a responding end device based on device identification 801 contained in a response from the end device. The location information may then be included in a notification to user about action that should be performed at the end device.

Figure 9:
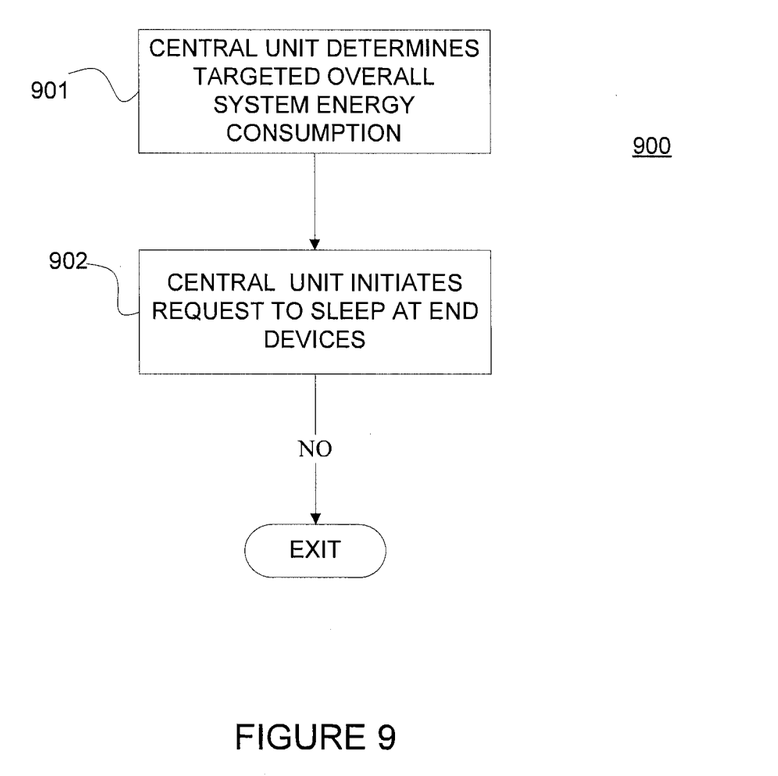
FIG. 9 shows a flow diagram for a central unit configuring a sleep mode for an end device based on a targeted system energy usage in accordance with an embodiment.

FIG. 9 shows flow diagram 900 for central unit 101 configuring a sleep mode for an end device 102 based on targeted system energy consumption in accordance with an embodiment. At block 901, central unit 101 determines targeted overall energy consumption for network 100 over a period of time ($T_{span}$), e.g., an hour, day, week, or month.

Referring to FIG. 1, the consumed energy of network 100 is the sum of energy consumptions for central device 101, routers 110-111, and end devices 102-109, where:

$$E_{network} = E_{end\_devices} + E_{routers} + E_{central\_unit} \quad \text{(EQ. 1)}$$

Typically, operation of routers 110-111 and central unit 101 should not be changed.

Consequently, only end devices 102-109 are modified to selectively operate in a sleep mode in order to reduce energy consumption. With some embodiments, $E_{network}$ is the targeted energy consumption of network 100 while $E_{routers}$ and $E_{central\_unit}$ are known a priori or are measured. In such a case, central unit 101 will modify sleep mode operation of end devices 102-109 (corresponding to $E_{end\_devices}$).

With some embodiments, the energy consumption of the $i^{th}$ end device ($E_i$) may be determined from the energy consumed during sleep mode operation ($E_{sleep,i}$) and the energy consumed during wake mode operation ($E_{wake,i}$). The corresponding consumed power may be measured or known a priori for each end device 102-109. Consequently, the consumed energy can be determined from the consumed power during the times that the each device is in the sleep and wake states. $E_{end\_devices}$ is the sum of the consumed energy for all of the end devices (N) and can be expressed as:

$$E_{end\_devices} = \Sigma_{i=1}^{N}(P_{sleep,i} * T_{sleep,i} + P_{wake,i} * T_{wake,i}) \quad \text{(EQ. 2)}$$

With some embodiments, an end device can be only in the sleep state or in the wake state, and consequently, $T_{sleep,i} = T_{span} - T_{wake,i}$. In such cases, EQ. 2 can be written as:

$$E_{end\_devices} = \sum_{i}^{N} T_{wake,i} * (P_{wake,i} - P_{sleep,i}) + T_{span} * P_{sleep,i} \quad \text{(EQ. 3)}$$

With some embodiments, all of the end devices may be treated with the same priority so that each of the end devices is in the wake state for the same amount of time ($T_{wake}$) during $T_{span}$. In such a case:

$$T_{wake} = \frac{E_{end\_devices} - T_{span} * \sum_{i=1}^{N} P_{sleep,i}}{\sum (P_{wake,i} - P_{sleep,i})} \quad \text{(EQ. 4)}$$

where $$T_{sleep} = T_{span} - T_{wake} \quad \text{(EQ. 5)}$$

While EQs. 4 and 5 express the total sleep and wake times of an end device, sleep mode operation can be administered differently over $T_{span}$. For example, central unit 101 can initiate sleep operation of an end device in a uniform manner over $T_{span}$ or only during times of relative inactivity (e.g., during the night time). Also, sleep times for different end devices can be staggered in time to mitigate network traffic over network 100 when the end devices wake.

With some embodiments, end devices 102-109 may be associated with different priority levels, in which the wake time of a frequently active end device is in the wake state for a longer period of time than an end device that is relatively inactive. For example, if the $i^{th}$ end device is assigned to the $k^{th}$ priority level:

$$T_{wake,i} = M_k * T_{wake} \quad \text{(EQ. 6)}$$

where $M_k$ is a multiplier associated with the $k^{th}$ priority level and $T_{wake}$ is the base wake time. The resulting $T_{wake,i}$ can then be applied to EQ. 3 to determine $T_{wake}$.

When the wake and sleep times have been determined at block 901, central unit 101 can instruct the end devices to operate in the sleep mode at appropriate times during $T_{span}$ at block 902 so that the target energy consumption of network 100 can be achieved. For example, central unit 101 may initiate a request to sleep to end device 102 with a predetermined time or RSM code.

Embodiments of the disclosure may include forms of computer-readable media. Computer-readable media include any available media that can be accessed by a processing device. e.g., processing device 201 or 301 as shown in FIGS. 2 and 3, respectively. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   at least one memory; and
   at least one processor coupled to the at least one memory and configured to perform, based on instructions stored in the at least one memory:
   obtaining sleep information for a first end device connected to a network, wherein:
   the sleep information is indicative when the first end device operates in a sleep mode;
   the network is connected to a plurality of end devices; and
   the plurality of end devices includes the first end device;
   determining a scanning time based on the sleep information;
   determining whether a response is received from the first end device within the scanning time when the first end device wakes up from the sleep mode;
   instructing the first end device to initiate sleep mode operation for a time duration;
   determining a targeted energy usage for the network; and
   determining the time duration of the sleep mode operation for the first end device based on the targeted energy usage for the network, wherein the time duration is dependent on a device energy usage of all other end devices connected to the network.

2. The apparatus of claim 1, wherein the at least one processor is further configured to perform:
   receiving tolerance information from the first end device, the tolerance information indicative of a clock accuracy of the first end device; and
   based on the tolerance information, adjusting the sleep information to obtain the scanning time to receive the response from the first end device.

3. The apparatus of claim 1, wherein the at least one processor is further configured to perform:
   receiving a request from the first end device, wherein the request includes status information that is indicative of an operating condition of the first end device.

4. The apparatus of claim 3, wherein the at least one processor is further configured to perform:
   converting the status information to a sleep time value, wherein the sleep time value is indicative of when the first end device operating in the sleep mode.

5. The apparatus of claim 3, wherein the at least one processor is further configured to perform:
   determining an action indicator from the status information, the action indicator indicating an action to be initiated for the first end device.

6. The apparatus of claim 3, wherein the request contains a device identifier and wherein the at least one processor is further configured to perform:
   converting the device identifier to a location indicator.

7. The apparatus of claim 5, wherein the at least one processor is further configured to perform:
   sending the action indicator to a display device.

8. The apparatus of claim 4, wherein the status information contains a code and wherein the at least one processor is further configured to perform:
   translating the code to the sleep time value.

9. The apparatus of claim 8, wherein the at least one processor is further configured to perform:
   receiving translation information from the first end device for the translating.

10. The apparatus of claim 1, wherein the at least one processor is further configured to perform:
    setting the time duration to a predetermined value.

11. The apparatus of claim 1, wherein the at least one processor is further configured to perform:
    sending a code indicator to the first end device that is indicative of the time duration.

12. The apparatus of claim 1, wherein the at least one processor is further configured to perform:
    prioritizing the plurality of end devices into a plurality of priority levels; and
    determining a wake time of the first end device based on a first priority level of the first end device, wherein the plurality of priority levels includes the first priority level.

13. The apparatus of claim 1, wherein the at least one processor is further configured to perform:
    receiving a battery status of the first end device; and
    adjusting the time duration for the sleep mode operation from the battery status.

14. The apparatus of claim 1, wherein the time duration is dependent on a total device energy usage of the plurality of end devices.

15. The apparatus of claim 1, wherein the network includes at least one router and wherein the targeted energy usage for the network includes a router power consumption for the at least one router.

16. The apparatus of claim 1, wherein the network includes a central processing device and wherein the targeted energy usage for the network includes a central processing power consumption for the central processing device.

17. A method comprising:
    obtaining sleep information for a first end device connected to a network, wherein the sleep information is indicative when the first end device operates in a sleep mode, the network is connected to a plurality of end devices, and the plurality of end devices includes the first end device;
    determining a scanning time from the sleep information;
    determining whether a response is received from the first end device within the scanning time when the first end device wakes up from the sleep mode;
    instructing the first end device to initiate sleep mode operation for a time duration;
    determining a targeted energy usage for the network; and
    determining the time duration of the sleep mode operation for the first end device based on the targeted energy usage for the network, wherein the time duration is dependent on a device energy usage of all other end devices connected to the network.

18. The method of claim 17, further comprising:
    receiving tolerance information from the first end device, the tolerance information indicative of a clock accuracy of the first end device; and
    based on the tolerance information, adjusting the sleep information to obtain the scanning time to receive the response from the first end device.

19. The method of claim 17, further comprising:
    prioritizing the plurality of end devices into a plurality of priority levels; and
    determining a wake time of the first end device based on a first priority level of the first end device, wherein the plurality of priority levels includes the first priority level.

20. The method of claim 17, further comprising:
    receiving a battery status of the first end device: and
    adjusting the time duration for the sleep mode operation from the battery status has changed.

21. The method of claim 19, wherein the determining the wake time of the first end device comprises:
    multiplying a base wake time by a first multiplier associated with the first priority level.

22. A non-transitory computer-readable storage medium storing computer-executable instructions that, when executed, cause a processor at least to perform operations comprising:
- obtaining sleep information for a first end device connected to a network, wherein:
  - the sleep information is indicative when the first end device operates in a sleep mode;
  - the network is connected to a plurality of end devices; and
  - the plurality of end devices includes the first end device;
- determining a scanning time based on the sleep information;
- determining whether a response is received from the first end device within the scanning time when the first end device wakes up from the sleep mode;
- instructing the first end device to initiate sleep mode operation for a time duration;
- determining a targeted energy usage for the network; and
- determining the time duration of the sleep mode operation for the first end device based on the targeted energy usage for the network, wherein the time duration is dependent on a device energy usage of all other end devices connected to the network.

23. The non-transitory computer-readable storage medium of claim 22, wherein the computer-executable instructions, when executed, cause the processor to perform:
- categorizing the first end device as a first priority level from a plurality of priority levels; and
- obtaining a device wake time for the first end device from a first multiplier associated with the first priority level and a base wake time.

* * * * *